Aug. 16, 1938.  J. C. MARSHALL  2,126,902
ACETYLENE GENERATOR
Filed Jan. 24, 1934  2 Sheets-Sheet 1
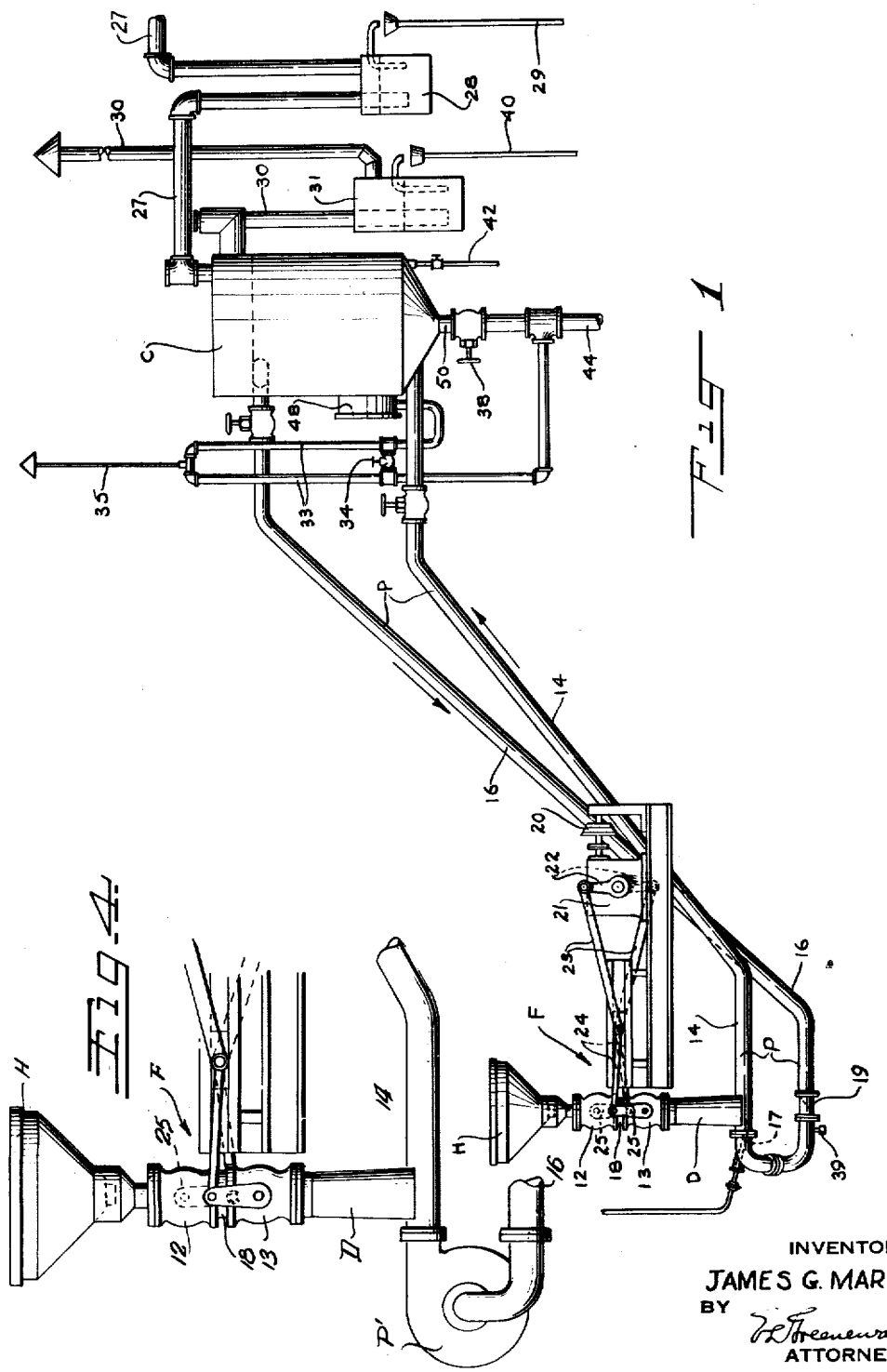
INVENTOR
JAMES G. MARSHALL
BY
*H.L.Freuenwald*
ATTORNEY

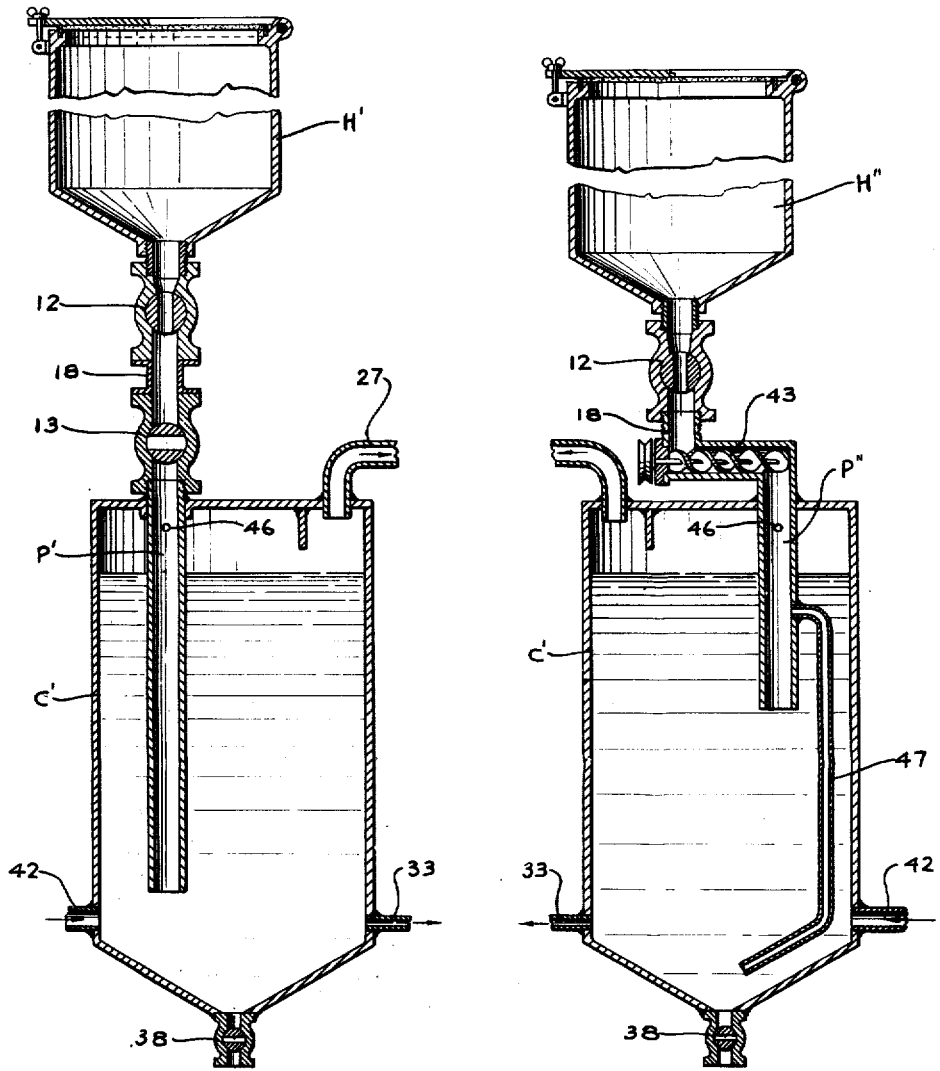

Patented Aug. 16, 1938

2,126,902

UNITED STATES PATENT OFFICE 2,126,902

ACETYLENE GENERATOR

James G. Marshall, Niagara Falls, N. Y., assignor, by mesne assignments, to Union Carbide and Carbon Corporation, a corporation of New York Application January 24, 1934, Serial No. 708,042

21 Claims. (Cl. 48—38)

The invention relates to gas generation. More specifically, the invention provides a novel apparatus and process for generating acetylene by the reaction of water with calcium carbide. The apparatus of the invention may also be used to generate other gases by reactions of liquids with solids.

A commonly used method for generating acetylene comprises dropping granules or pieces of calcium carbide onto a relatively extensive surface of a body of water, collecting the gas above the surface, and permitting the lime formed by the reaction to settle to the bottom of the body of water, whence it may be withdrawn as a sludge.

It has long been recognized that if the carbide used in the ordinary type of acetylene generators embodying the above-described method contains a large proportion of carbide dust and fines, certain hazards are created, and impure acetylene may result. Carbide fines and dust tend to form "islands" on the surface of the water. The islands may gradually increase in size, and then suddenly capsize and sink, with the result that there is an abrupt generation of gas, a sudden rise of pressure in the gas-collection system, local overheating, and splashing of carbide and sludge onto the upper portions of the generator chamber where further local overheating occurs.

Further, large pieces of calcium carbide tend to sink rapidly through the water and become buried in the sludge at the bottom, where generation of gas, dissipation of heat, and liberation of gas occur relatively slowly. This may result in local overheating and loss of a certain amount of unreacted carbide.

Local overheating not only introduces an explosion hazard; it tends also to cause polymerization of the gas, with a corresponding decrease in both yield and purity of the gas.

One precaution frequently used to reduce the hazards and other drawbacks of this method is to use uniformly sized particles of calcium carbide. By using carbide that is comparatively free from dust the tendency to form "islands" is greatly decreased, and by using no very large pieces it is also possible to decrease the tendency of the carbide particles to become lodged in the bottom-sludge before they are completely reacted.

From many standpoints it is highly desirable that a method and apparatus be available for using, with safety and efficiency, miscellaneous sizes of calcium carbide, such as are produced directly by a crusher. The operation of sizing and grading imposes an additional cost of production. The bulk density is lower, and hence the cost of shipping containers is higher per pound, for uniformly sized material than for material in mixed miscellaneous sizes. If the fines must be discarded, the cost of their production is naturally borne by the useful product. Even more important, perhaps, is the fact that during the sizing and grading operations a certain amount of gas is evolved, and this results in a degraded product. Inasmuch as the amount of gas thus lost depends to some extent on atmospheric humidity, it becomes impossible to avoid a seasonal variation in the quality of the sized and graded product.

For these and other reasons proposals have been made to adapt the above-described carbide-to-water generators to the use of run-of-crusher carbide. These proposals have included mechanical agitators or water sprays on the surface of the generator water to break up floating islands, and mechanical agitators in the lime sludge. While these devices accomplish to some degree the purposes for which they have been proposed, it is found that their use introduces serious difficulties. Mechanical agitators not only are relatively expensive to install and to operate, but they also require frequent repairs, because they operate in a mixture of limewater, lime, unreacted calcium carbide, and highly abrasive residues comprising silicides of iron.

It is therefore an object of the invention to provide a noval apparatus and process for generating acetylene by adding calcium carbide to a relatively large body of water, wherein the above-outlined disadvantages and limitations of known methods and devices are in great part obviated.

The invention will be described in connection with the accompanying drawings, showing representative embodiments of suitable apparatus for practising the invention, in which Fig. 1 is an elevational view of one arrangement of an apparatus for generating gas according to the present invention; Figs. 2 and 3 are vertical sectional views showing portions of modified forms of generators embodying features of this invention; and Fig. 4 is an alternative construction showing the use of a mechanical pump instead of a water jet and check valve for maintaining unidirectional flow of the reactant material and for augmenting the force incident to the reaction thereof.

Figure 1 of the drawings illustrates an acetylene generating apparatus embodying this invention. In this apparatus, a suitable feeding mechanism F feeds intermittent predetermined portions of carbide from a hopper H to and through a downtake pipe D into the return leg 14 of a pipe or similar conduit P containing water, both legs 14 and 16 of which are connected to a separating chamber C. A check valve 19 serves to prevent the flow of material from the return leg 14 into the leg 16 of the pipe P, hence, the intermittent surges of gas generated in the return leg 14 force each portion of carbide and reaction products of that portion away from the check valve 19 and into the chamber C. The supply leg 16 of the pipe P returns water from the chamber C to the return leg 14. A pulsating stream of water is thus maintained in the pipe P.

Referring in more detail to Figure 1, the valve mechanism F suitably consists of a plug valve 12, a chamber 18, and a second plug valve 13. The valve mechanism is preferably so operated that the upper valve 12 is closed when the lower valve 13 is open, and the lower valve 13 is closed when the upper valve 12 is open. A reciprocating action of the valves 12 and 13 may be obtained by means of valve arms 25, connecting rods 24, and push rods 23 actuated by rotating arms 22, a speed reducer 21, and a drive pulley 20.

The stream of water in the pipe P conducts each portion of carbide and its reaction products in turbulent motion at a relatively high speed, thereby promoting a thorough wetting of any carbide fines and dust which may be present and an efficient cooling of the reaction products. Preferably, the return leg 14 is connected to the chamber C at the lower portion of the body of water, and the supply leg 16 is connected to the chamber at the water level of the latter, so that the circulation of water within the chamber is in such a direction as to promote turbulence of unreacted carbide sludge, and gas, thereby rapidly completing the reaction, efficiently cooling the reaction products, and effectively scrubbing the gas.

When not more than a few sharp elbows are used, the pipe P may be several hundred feet long if desired. Means may be provided, when necessary or desirable, to increase the velocity of flow of materials. Suitable means for this purpose include a water-jet 17 inserted in the pipe P. A mechanical pump may be used instead of the water jet 17, for example, a unidirectional material-circulating pump P', in which instance check valve 19 may be dispensed with.

The separating chamber C, containing a relatively large body of water and gas above the water, may be provided with a suitable acetylene outlet pipe 27, a safety vent pipe 30, a water inlet pipe 42, a water overflow pipe 33, a cleanout door 48, and a drain connection 50. The acetylene outlet pipe 27 should be provided with a liquid seal 28 or other flame-arrestor, and the safety vent pipe 30 may be provided with a liquid seal 31 or an equivalent pressure-relief device. Entrained water trapped in the seals 28 and 31 may be overflowed to waste through pipes 29 and 40, respectively. The overflow pipe 33, which may for convenience be shunted by a valve 34, should be provided with a vapor vent 35 to prevent syphoning. The overflow pipe 33 may empty into a drain 44; and the drain connection 50 may open into the drain 44 through a suitable valve 38. Sludge may be removed from the chamber C through the pipe 33, the door 48, or the drain connection 50.

The carbide feeding end of the generator may be either above or below the separating chamber C. When the feeding end is the lower, the vertical downtake pipe D, being closed at its upper end by the valve mechanism, remains filled with acetylene which acts as a cushion and tends to prevent access of water to the valve mechanism. Also, in this case, the pipes 14 and 16 may be drained through an outlet 39 placed at the lowest point in the system.

In the form of generator shown in Figure 1, run of crusher size carbide containing dust, or even carbide dust alone, may be employed safely. If large lumps of carbide are present, they are thoroughly reacted by being kept in constant motion within the pipe P and the chamber C. Further, since the feeding end of the generator may be a considerable distance from, and below, the separating chamber C, the generator may be fed at ground-level near the point of storage of carbide, thereby eliminating the need for the usual conveyors and hoists for handling the carbide.

Modifications of the apparatus shown in Figure 1 are clearly possible. Any suitable feeding mechanism may be substituted for that shown, for example, a slide-valve, a flap-valve, or a rotating-gate valve may be used. The pipes 14 and 16 may be of any cross-sectional shape.

Figure 2 is a cross-section of another embodiment of the invention. A separating chamber C' containing water is fitted with a hopper H' for calcium carbide, a small chamber 18, and valves 12 and 13, for feeding carbide intermittently into a pipe P' having a relatively small cross-sectional area as compared with the chamber C'. The pipe P' extends into the water for a distance sufficient to promote effective wetting of the carbide within the pipe P'. A small aperture 46 in the pipe P' is provided to permit water to rise within the pipe after each unit of carbide and gas has blown out of the open end of the pipe into the separating chamber C'. A pulsating stream of water is thus maintained in the pipe P'. In the separating chamber C', the intermittent surges of gas impart turbulence to the water, thereby further promoting complete reaction of calcium carbide, efficient cooling of the reaction products, and effective scrubbing of the gas. The acetylene may be collected above the surface of the water, and removed through a pipe 27. A water inlet pipe 42, a water outlet pipe 33, and a sludge clean-out valve 38 may be fitted to the chamber C'.

Figure 3 is a cross-section of a further embodiment of the invention, wherein a separating chamber C' containing water is fitted with a hopper H'', a valve 12, a small chamber 18, and a screw-type feed valve 43 which feeds carbide intermittently into a pipe P''. The pipe P'' may be provided with a tube 47, of smaller cross-section than the pipe P'', which extends to the lower portion of the chamber C' ordinarily occupied by a heavy bed of sludge. Water in the tube 47 will acquire a velocity each time pressure is built up in the pipe P'', and, issuing from the end of the tube 47, will seve to agitate the sludge. In other respects the embodiment shown in Figure 3 is similar to that shown in Figure 2.

Various modifications of the apparatus shown in Figures 2 and 3 are apparent. For example, the pipe P' may be entirely outside of the chamber C', in which case the lower end of the pipe would enter the chamber C' below the surface of the liquid, and aperture 46 might suitably be replaced with a tube (not shown) to connect the gas space in the chamber with the gas space in the pipe; or any portion of the pipe P' except the discharge end thereof may be outside the chamber C'. Further, the pipe P' may have any cross-sectional shape, and is not necessarily straight. The feeding mechanism may be within the chamber C', in which case it would preferably be placed in the gas space rather than in the liquid.

In the operation of the generators shown in Figures 2 and 3, the amount of calcium carbide used for each portion fed to the pipe P' may be predetermined, and should be materially greater than that amount which would liberate a volume of gas equal to the volume of pipe P', but not greater than will pass readily through the pipe P'. A few trials will establish the most suitable weight of charge for the particular apparatus dimensions chosen. The weight of each portion will be not at all critical under most conditions. Removal of gas, lime, and abrasive sludge may be accomplished in any of the many known ways.

I claim:

1. Gas generating apparatus comprising a relatively large container adapted both to contain a body of liquid and to confine gas; a pipe of relatively small diameter opening into said container and normally adapted to be substantially filled with and to confine a portion of such liquid; means for forcibly ejecting the liquid within said pipe into said container by intermittently feeding gas-forming material into the liquid in said pipe to generate gas within said pipe, the liquid in said pipe and the gas so generated discharging into said body of liquid; and means for restoring from such body the liquid discharged from said pipe.

2. Apparatus for generating acetylene which includes a chamber adapted to contain a relatively large body of water and acetylene above the water; a hopper adapted to contain calcium carbide and provided with a valve for delivering intermittently predetermined portions of carbide, a second valve, either of which valves is to be closed when the other is open, and a relatively small compartment between the two valves adapted to hold each portion of carbide after the closing of the first valve and before the opening of the second valve; a pipe adapted to contain water and to conduct acetylene and carbide from said second valve to a point within and substantially below the surface of the large body of water in said chamber; and a second pipe to return water from the chamber to the carbide-feed end of said first-mentioned pipe, said second pipe being provided with a check-valve to insure unidirectional flow of water from the chamber to the said feed end.

3. Apparatus for generating acetylene which includes a chamber adapted to contain a relatively large body of water and acetylene above the water; a hopper adapted to contain calcium carbide and provided with a valve for delivering intermittently predetermined portions of carbide, a second valve, either of which valves is to be closed when the other is open, and a relatively small compartment between the two valves adapted to hold each portion of carbide after the closing of the first valve and before the opening of the second valve; a pipe adapted to contain water and to conduct acetylene and carbide from said second valve to a point within and substantially below the surface of the large body of water in the chamber; a second pipe to return water from the chamber to the carbide-feed end of the first-mentioned pipe, said second pipe being provided with a check-valve to insure unidirectional flow of water from the chamber to the said feed end; and means, other than and in addition to the generation of acetylene, for imparting velocity to the water circulating in the two pipes.

4. Apparatus for generating acetylene which includes a chamber adapted to contain a relatively large body of water and acetylene above the water; a hopper adapted to contain calcium carbide and provided with a valve for delivering intermittently predetermined portions of carbide, a second valve, either of which valves is to be closed when the other is open, and a relatively small compartment between the two valves adapted to hold each portion of carbide after the closing of the first valve and before the opening of the second valve; a pipe adapted to contain water and to conduct acetylene and carbide from said second valve to a point within and substantially below the surface of the large body of water in the chamber; a second pipe to return water from the chamber to the carbide-feed end of the first-mentioned pipe, said second pipe being provided with a check-valve to insure unidirectional flow of water from the chamber to the said feed end; and a water-jet for imparting velocity to the water circulating in the two pipes.

5. Process for generating acetylene which comprises circulating a stream of water within a pipe to and from a main body of water by feeding calcium carbide portion-wise into said stream at a point separated from said main body of water, whereby the carbide and reaction products thereof are intermittently forced through the pipe into the said main body of water; and separating acetylene from the said main body of water.

6. Process for generating acetylene which comprises feeding calcium carbide portionwise into the top of a column of water contained in a pipe, whereby each surge of acetylene generated at the top of the column by the reaction of part of respective portions of carbide forces a stream of materials including water, carbide, and reaction products thereof downwards in the pipe; conducting such stream to and into a relatively large body of water contained in a tank, at least part of the stream being conducted into the lower portion of said large body of water; limiting upward flow of material in said pipe to a desired relatively slow rate for restoring the column of water in the pipe after the discharge of each portion of carbide and reaction products thereof into the main body of water; and separating acetylene from the said main body of water.

7. In an apparatus for generating acetylene comprising a large container having a body of water therein; a relatively long narrow pipe filled with water and communicating at one end with the upper part of the body of water, said pipe extending away from the container and back, the other end of said pipe communicating with the lower part of the body of water; means for circulating the water to and from said container and through said pipe including feeding means for intermittently delivering portions of calcium carbide to said pipe at a position intermediate its two ends; and means for causing unidirectional circulation of water within said pipe.

8. In a process for generating gas, the steps comprising enclosing a narrow column of aqueous fluid in communication with a relatively large confined body of such fluid; effecting movement of the column of fluid by introducing to within the enclosed column and in admixture with the fluid at a point separated from the body of fluid, material coacting with the fluid to form gas; and causing the generated gas to force the mixture turbulently along the narrow enclosed column into the large confined body of fluid.

9. Apparatus for generating acetylene comprising conduit means forming a complete circuitous path; means in said path for providing a substantially continuous flow of material including means for feeding calcium carbide into said conduit at one point of the path; means for limiting said flow to one direction; means at another relatively distant point of said path for separating and withdrawing acetylene; and means for introducing an auxiliary stream of water into the flow of materials in said path at a point in advance of the point of feeding calcium carbide.

10. Apparatus for generating acetylene comprising an enclosed container conduit means forming a complete circuitous path having upwardly and downwardly directed portions leading to and from the bottom and top of said container respectively; means for providing a substantially continuous circuitous flow of water in one direction only through said path; means for feeding calcium carbide into said conduit at a relatively low point of the upwardly directed portion of the path; means at another relatively higher point of said path for separating and withdrawing acetylene materials in said path at a point in advance of the point of feeding the calcium carbide; and means for collecting and discharging a lime product from said path.

11. A process for generating acetylene which comprises causing a flow of water to occur substantially continuously in a unidirectional circuitous path having upflowing and downflowing portions; introducing calcium carbide into said flow of water at a relatively low point of the upward flowing portion to cause the acetylene being generated during the flow to assist said flow in the upward direction; introducing water into said flow of material at a point in advance of the point of introduction of calcium carbide; separating and collecting acetylene from said flow at a point relatively higher than the point of feeding carbide; and withdrawing a lime product from said path at still another point.

12. A process for generating acetylene which comprises causing a flow of water to occur substantially continuously in a unidirectional circuitous path having upflowing and downflowing portions; introducing calcium carbide into said flow of water at a relatively low point of the upward flowing portion to cause the acetylene being generated during the flow to assist the same in an upward direction; and separating and collecting acetylene from said flow at a point relatively higher than the point of introducing carbide.

13. A process of generating acetylene which comprises circulating a stream of water in a unidirectional path having upward and downward extending portions which lead to and from an enclosed main body of water by feeding calcium carbide intermittently into said stream at a substantially low point in the upward extending portion thereof whereby the carbide and reaction products are intermittently forced along said path into the bottom of the main body of water by the reaction of the carbide with said stream.

14. A process of generating acetylene which comprises intermittently introducing portions of calcium carbide into a confined substantially vertical column of water extending to a point near the bottom of a larger body of water, said portions being sufficient to displace substantially all of the water and reaction products within the column and to discharge them into the large body of water at the bottom thereof; and restrictively equalizing the pressures above said column and above said larger body of water, thereby effecting the refilling of the confined column of water during the interim between the successive introductions of the carbide.

15. A process of generating acetylene which comprises intermittently introducing portions of calcium carbide into a confined column of water having a pressure head and extending to a point near the bottom of a large body of water; said portions being sufficient to displace substantially all of the water and reaction products within the column and to discharge them into the large body of water at the bottom thereof; and effecting replacement of said column of water during the interim between successive introductions of calcium carbide.

16. In apparatus for generating acetylene, a container adapted to contain a body of water and provide a gas space thereabove; a pipe extending from a point near the bottom of said container to a point substantially distant therefrom and adapted to confine a substantially long column of water; and means for intermittently feeding charges of carbide to said confined column of water sufficient to displace the materials within said column upon reaction with the water therein, whereby said reacting materials are discharged into said large body of water near the bottom thereof in a highly turbulent state.

17. Apparatus for generating gas by reacting a solid with a liquid which includes a chamber adapted to contain a relatively large body of the liquid, means for feeding portions of the solid into a pipe normally adapted to be substantially filled with liquid, to form an auxiliary reacting chamber, and to conduct materials from said feeding means to a point within the large body of liquid, the construction and arrangement of the parts being such that the materials are forced into the body of liquid by an increased volume of materials in the pipe created by the generation of gas therein.

18. Apparatus for generating acetylene which includes a chamber adapted to contain a relatively large body of water and acetylene above the water; a hopper adapted to contain calcium carbide and provided with a valve for delivering intermittently predetermined portions of carbide, a second valve, either of which valves is to be closed when the other is open, and a relatively small compartment between the two valves adapted to hold each portion of carbide after the closing of the first valve and before the opening of the second valve; a pipe of relatively small diameter normally adapted to be substantially filled with water and to forcefully conduct carbide and the products formed during the reaction of carbide and water within said pipe from said second valve to a point within and substantially below the surface of the large body of water in said chamber, the construction and arrangement of the parts being such that the materials are forced into the body of water by an increased volume of materials in the pipe created by the generation of acetylene therein.

19. Apparatus for generating acetylene comprising conduit means forming a complete circuitous path of reactant material; means in said path for providing a substantially continuous flow of said material including means for feeding calcium carbide into the material within said conduit means at one point of the path; mechanical pump means for limiting said flow to one direction and for augmenting the force incident to the reaction of the carbide with said material located in said path at a point in advance of the point of feeding calcium carbide; and means at another relatively distant point of said path for separating and withdrawing acetylene.

20. An acetylene generator comprising a container adapted to confine a relatively large body of water as well as acetylene above said body of water; means for independently confining a portion of said body of water and for maintaining liquid communication between the body and said portion; means for feeding calcium carbide portion-wise into said independently confined portion of water whereby the action between the carbide and said portion of water causes the mixture to be turbulently discharged into said large body of water; and means in the independent confining means and communicating with the acetylene above said water for restoring a portion of said large body of water to said independent confining means.

21. An acetylene generator comprising a main reaction chamber adapted to contain water; an auxiliary reaction chamber in liquid communication with said main chamber; means for feeding calcium carbide portion-wise into said auxiliary chamber, whereby the chemical reaction between the carbide and the water therein causes the mixture to be turbulently discharged into said main chamber; and conduit means communicating with said auxiliary chamber and extending to a point near the bottom of said main chamber for transmitting the force of said chemical reaction to the bottom of said main reaction chamber through the aid of the material confined within said conduit means for stirring the sludge contained within the bottom of said main chamber.

JAMES G. MARSHALL.

CERTIFICATE OF CORRECTION.

Patent No. 2,126,902.     August 16, 1938.

JAMES G. MARSHALL.

It is hereby certified that error appears in the printed specification of the above numbered patent requiring correction as follows: Page 1, second column, line 34, for "noval" read novel; page 2, second column, line 64, for "seve" read serve; page 3, second column, line 54, claim 6, for "bodv" read body; page 4, first column, line 20, claim 10, after the word "container" insert a semicolon; and lines 31 to 34 inclusive, same claim, strike out the words materials in said path at a point in advance of the point of feeding the calcium carbide; and means for collecting and discharging a lime product from said path; and that the said Letters Patent should be read with this correction therein that the same may conform to the record of the case in the Patent Office.

Signed and sealed this 25th day of October, A. D. 1938.

Henry Van Arsdale (Seal)     Acting Commissioner of Patents.

path for providing a substantially continuous flow of said material including means for feeding calcium carbide into the material within said conduit means at one point of the path; mechanical pump means for limiting said flow to one direction and for augmenting the force incident to the reaction of the carbide with said material located in said path at a point in advance of the point of feeding calcium carbide; and means at another relatively distant point of said path for separating and withdrawing acetylene.

20. An acetylene generator comprising a container adapted to confine a relatively large body of water as well as acetylene above said body of water; means for independently confining a portion of said body of water and for maintaining liquid communication between the body and said portion; means for feeding calcium carbide portion-wise into said independently confined portion of water whereby the action between the carbide and said portion of water causes the mixture to be turbulently discharged into said large body of water; and means in the independent confining means and communicating with the acetylene above said water for restoring a portion of said large body of water to said independent confining means.

21. An acetylene generator comprising a main reaction chamber adapted to contain water; an auxiliary reaction chamber in liquid communication with said main chamber; means for feeding calcium carbide portion-wise into said auxiliary chamber, whereby the chemical reaction between the carbide and the water therein causes the mixture to be turbulently discharged into said main chamber; and conduit means communicating with said auxiliary chamber and extending to a point near the bottom of said main chamber for transmitting the force of said chemical reaction to the bottom of said main reaction chamber through the aid of the material confined within said conduit means for stirring the sludge contained within the bottom of said main chamber.

JAMES G. MARSHALL.

CERTIFICATE OF CORRECTION.

Patent No. 2,126,902. August 16, 1938.

JAMES G. MARSHALL.

It is hereby certified that error appears in the printed specification of the above numbered patent requiring correction as follows: Page 1, second column, line 34, for "noval" read novel; page 2, second column, line 64, for "seve" read serve; page 3, second column, line 54, claim 6, for "bodv" read body; page 4, first column, line 20, claim 10, after the word "container" insert a semicolon; and lines 31 to 34 inclusive, same claim, strike out the words materials in said path at a point in advance of the point of feeding the calcium carbide; and means for collecting and discharging a lime product from said path; and that the said Letters Patent should be read with this correction therein that the same may conform to the record of the case in the Patent Office.

Signed and sealed this 25th day of October, A. D. 1938.

Henry Van Arsdale (Seal) Acting Commissioner of Patents.